US008935500B1

(12) United States Patent
Gulati et al.

(10) Patent No.: US 8,935,500 B1
(45) Date of Patent: Jan. 13, 2015

(54) DISTRIBUTED STORAGE RESOURCE SCHEDULER AND LOAD BALANCER

(75) Inventors: Ajay Gulati, Palo Alto, CA (US); Irfan Ahmad, Mountain View, CA (US); Carl A. Waldspurger, Palo Alto, CA (US); Chethan Kumar, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 74 days.

(21) Appl. No.: 13/293,516

(22) Filed: Nov. 10, 2011

Related U.S. Application Data

(63) Continuation-in-part of application No. 12/566,435, filed on Sep. 24, 2009.

(51) Int. Cl.
*G06F 12/00* (2006.01)

(52) U.S. Cl.
USPC ........... 711/165; 711/147; 711/170; 711/171; 711/172; 711/114; 718/104; 718/105

(58) Field of Classification Search
CPC ..... G06F 17/00; G06F 17/10; G06F 11/3065; G06F 11/3051; G06F 11/3433; G06F 11/30; G06F 2206/1508
USPC .......... 711/165, 147–153, 170–173; 718/105, 718/104
See application file for complete search history.

(56) References Cited

U.S. PATENT DOCUMENTS

| 5,881,238 | A * | 3/1999 | Aman et al. | 709/226 |
| 6,243,797 | B1 * | 6/2001 | Merritt | 711/167 |
| 7,017,012 | B2 * | 3/2006 | Clarke et al. | 711/141 |
| 7,302,541 | B2 * | 11/2007 | Hirezaki et al. | 711/165 |
| 7,469,289 | B2 * | 12/2008 | Arakawa et al. | 709/224 |
| 7,739,470 | B1 * | 6/2010 | Norgren | 711/168 |
| 7,818,746 | B2 * | 10/2010 | Anderson | 718/102 |
| 7,979,652 | B1 * | 7/2011 | Sivasubramanian | 711/162 |
| 8,209,511 | B2 * | 6/2012 | Tomita et al. | 711/165 |
| 2002/0116441 | A1 * | 8/2002 | Ding et al. | 709/105 |
| 2005/0081010 | A1 * | 4/2005 | DeWitt et al. | 711/165 |
| 2006/0236073 | A1 * | 10/2006 | Soules et al. | 711/216 |
| 2007/0022142 | A1 * | 1/2007 | Palmer et al. | 707/200 |
| 2007/0043860 | A1 * | 2/2007 | Pabari | 709/224 |
| 2008/0104350 | A1 * | 5/2008 | Shimizu et al. | 711/165 |
| 2008/0244196 | A1 * | 10/2008 | Shitomi et al. | 711/147 |
| 2008/0271039 | A1 * | 10/2008 | Rolia et al. | 718/105 |

(Continued)

OTHER PUBLICATIONS

"DVD Store," located at <http://www.delltechcenter.com/page/DVD+store>, visited on Jul. 19, 2010, 1 page.

(Continued)

*Primary Examiner* — Sanjiv Shah
*Assistant Examiner* — Edward Waddy, Jr.

(57) ABSTRACT

Distributed storage resources having multiple storage units are managed based on data collected from online monitoring of workloads on the storage units and performance characteristics of the storage units. The collected data is sampled at discrete time intervals over a time period of interest, such as a congested time period. Normalized load metrics are computed for each storage unit based on time-correlated sums of the workloads running on the storage unit over the time period of interest and the performance characteristic of the storage unit. Workloads that are migration candidates and storage units that are migration destinations are determined from a representative value of the computed normalized load metrics, which may be the 90th percentile value or a weighted sum of two or more different percentile values.

27 Claims, 8 Drawing Sheets

(56) References Cited

U.S. PATENT DOCUMENTS

| | | | | |
|---|---|---|---|---|
| 2009/0070771 | A1* | 3/2009 | Yuyitung et al. | 718/105 |
| 2009/0144725 | A1* | 6/2009 | Vrhel Jr. | 717/174 |
| 2009/0216910 | A1* | 8/2009 | Duchesneau | 709/250 |
| 2009/0222560 | A1* | 9/2009 | Gopisetty et al. | 709/226 |
| 2009/0228589 | A1 | 9/2009 | Korupolu | |
| 2009/0259749 | A1* | 10/2009 | Barrett et al. | 709/224 |
| 2009/0300283 | A1* | 12/2009 | Kudo | 711/114 |
| 2009/0313312 | A1* | 12/2009 | Colbeck et al. | 707/205 |
| 2010/0162003 | A1* | 6/2010 | Dodgson et al. | 713/193 |

OTHER PUBLICATIONS

"Iometer," located at <http://www.iometer.org>, visited on Jul. 19, 2010, 1 page.

"Usueful IO Profiles ofr Simulating Various Workloads," located at <http://blogs.msdn.com/b/tvoellm/ archive/2009/05/07/useful-io-profiles-for-simulating-various-workloads.aspx>, visited Jul. 19, 2010, 1 page.

I. Ahmad. "Easy and Efficient Disk I/O Workload Characterization in VMware ESX Server," IISWC, Sep. 2007.

G.A. Alvarez and et al. "Minerva: An Automated Resource Provisioning Tool for Large-Scale Storage Systems," in ACM Transactions on Computer Systems, pp. 483-518, Nov. 2001.

E. Anderson. "Simple Table-Based Modeling of Storage Devices," in SSP Technical Report, HP Labs, Jul. 2001.

E Anderson and et al. "Hippodrome: Running Circles Around Storage Administration," in Proc. of Conf. on File and Storage Technology (FAST'02), pp. 175-188, Jan. 2002.

A. Gulati, I. Ahmad, and C. Waldspurger "PARDA: Proportionate Allocation of Resources for Distributed Storage Access," in USENIX FAST, Feb. 2009.

A. Gulati, C. Kumar, and I. Ahmad. "Storage Workload Characterization and Consolidation in Virtualized Environments," in Workshop on Virtualization Performance: Analysis, Characterization, and Tools (VPACT), 2009.

S. Kavalanekar, B. B Worthington, Q. Zhang, and V. Sharda. "Characterization of Storage Workload Traces From Production Windows Servers," in IEEE IISWC, pp. 119-128, Sep. 2008.

A. Merchant and P.S. Yu. "Analytic Modeling of Clustered Raid with Mapping Based on Nearly Random Permutation," IEEE Trans. Comput., 45(3): p. 367-373, 1996.

M.P. Mesnier, M. Wachs, R.R. Sambasivan, A.X. Zheng, and G.R. Ganger. "Modeling the Relative Fitness of Storage," SIGMETRICS Perform. Eval. Rev., 35(1): p. 37-48, 2007.

B. Przydatek. "A Fast Approximation Algorithm for the Subset-Sum Problem," 1999.

C. Ruemmler and J. Wilkes. "An Introduction to Disk Drive Modeling," IEEE Computer, 27(3): 17-28, 1994.

Y.L. Shen and L. Xu. "An Difficient Disk I/O Characteristics Collection Method Based on Virtual Machine Technology," 10th IEEE Intl. Conf. on High Performance Computing and Comm., 2008.

E. Shriver, A. Merchant, and J. Wilkes. "An Analytic Behavior Model for Disk Drives with Readahead Caches and Request Reordering," SIGMETRICS Perform. Eval. Rev., 26(1): p. 182-191, 1998.

M. Uysal, G.A. Alvarez, and A. Merchant. "A Modular, Analytical Throughput Model for Modern Disk Arrays," in MASCOTS, 2001.

E. Varki, A. MErchant, J. Xu, and X. Qiu. "Issues nad Challenges in the performance Analysis of Real Disk Arrays," IEEE Trans. Parallel Distrib. Syst., 15(6): p. 559-574, 2004.

"VMware Infrastructure Resource Management with VMware DRS," 2006, located at <http://vmware.com/pdf/vmware_drs_wp.pdf>, visited on Jul. 19, 2010, 24 pages.

M. Wang, K. Au, A. Ailamaki, A. Brockwell, C. Faloutsos, and G.R. Ganger. "Storage Device Performance Prediction with CART Models," in MASCOTS, 2004.

\* cited by examiner

DISTRIBUTED STORAGE RESOURCE SCHEDULER AND LOAD BALANCER

CROSS-REFERENCE TO RELATED APPLICATIONS

This application is a continuation-in-part of U.S. patent application Ser. No. 12/566,435, filed Sep. 24, 2009, the entire contents of which are incorporated by reference herein.

BACKGROUND

A distributed storage system employs multiple storage arrays and serves multiple client computers over a network. In such a system, loads on the storage arrays will vary as demands from the client computers fluctuate. To optimize performance of the storage arrays, loads on the multiple storage arrays are observed and balanced when they become uneven.

Various approaches have been developed to improve the performance of storage arrays. The focus of one approach is storage array reconfiguration. In this approach, the storage array is reconfigured to better serve the applications running on it. Another approach is storage array performance modeling, where the storage arrays are modeled in terms of their performance. The goal is to create a model, which accurately describes the performance of the storage arrays. Given such a model, various "what if" scenarios can be modeled prior to implementation. A third approach implements block level migrations. The idea here is carry out block level migrations within a storage array or across multiple storage arrays to improve performance.

In virtualized computer systems, in which disk images of virtual machines are stored in the storage arrays, disk images of virtual machines are migrated between storage arrays as a way to balance the loads across the storage arrays. For example, the Storage VMotion™ product that is available from VMware Inc. of Palo Alto, Calif. allows disk images of virtual machines to be migrated between storage arrays without interrupting the virtual machine whose disk image is being migrated or any applications running inside it. However, the usage so far has been mostly manual and based on observations of loads on the storage arrays and there is a need for automating the task of identifying what to move and where.

SUMMARY

One or more embodiments of the present invention provide a distributed storage system having multiple storage units that are managed based on data collected from online monitoring of workloads on the storage units and performance characteristics of the storage units. The collected data is sampled at discrete time intervals over a time period of interest, such as a congested time period. Normalized load metrics are computed for each storage unit based on time-correlated sums of the workloads running on the storage unit over the time period of interest and the performance characteristic of the storage unit. Workloads that are migration candidates and storage units that are migration destinations are determined from a representative value of the computed normalized load metrics, which may be the 90th percentile value or a weighted sum of two or more different percentile values.

A method of managing distributed storage resources including at least a first storage unit and a second storage unit, according to an embodiment of the present invention, includes the steps of: while the first storage unit and the second storage unit are online, monitoring workloads associated with objects stored in the first storage unit and the second storage unit at multiple points in time over a time interval, and monitoring performance of the first storage unit and the second storage unit; computing normalized load metrics for the first storage unit based on time-correlated sums of the workloads monitored on the first storage unit over the time interval and the performance of the first storage unit; computing normalized load metrics for the second storage unit based on time-correlated sums of the workloads monitored on the second storage unit over the time interval and the performance of the second storage unit; and identifying one or more of the objects as candidates for migration between the first storage unit and the second storage unit based on the computed normalized load metrics of the first storage unit and the second storage unit.

A method of migrating workloads between a first storage unit and a second storage unit of a shared storage system that includes physically separate storage arrays, according to an embodiment of the present invention, includes the steps of: while the first storage unit and the second storage unit are online, monitoring workloads on the first storage unit and the second storage unit at multiple points in time over a time interval; computing normalized load metrics for the first storage unit based on time-correlated sums of the workloads monitored on the first storage unit over the time interval; computing normalized load metrics for the second storage unit based on time-correlated sums of the workloads monitored on the second storage unit over the time interval; and migrating one of the workloads between the first storage unit and the second storage unit based on the computed normalized load metrics of the first storage unit and the second storage unit.

DETAILED DESCRIPTION

Figure 1:
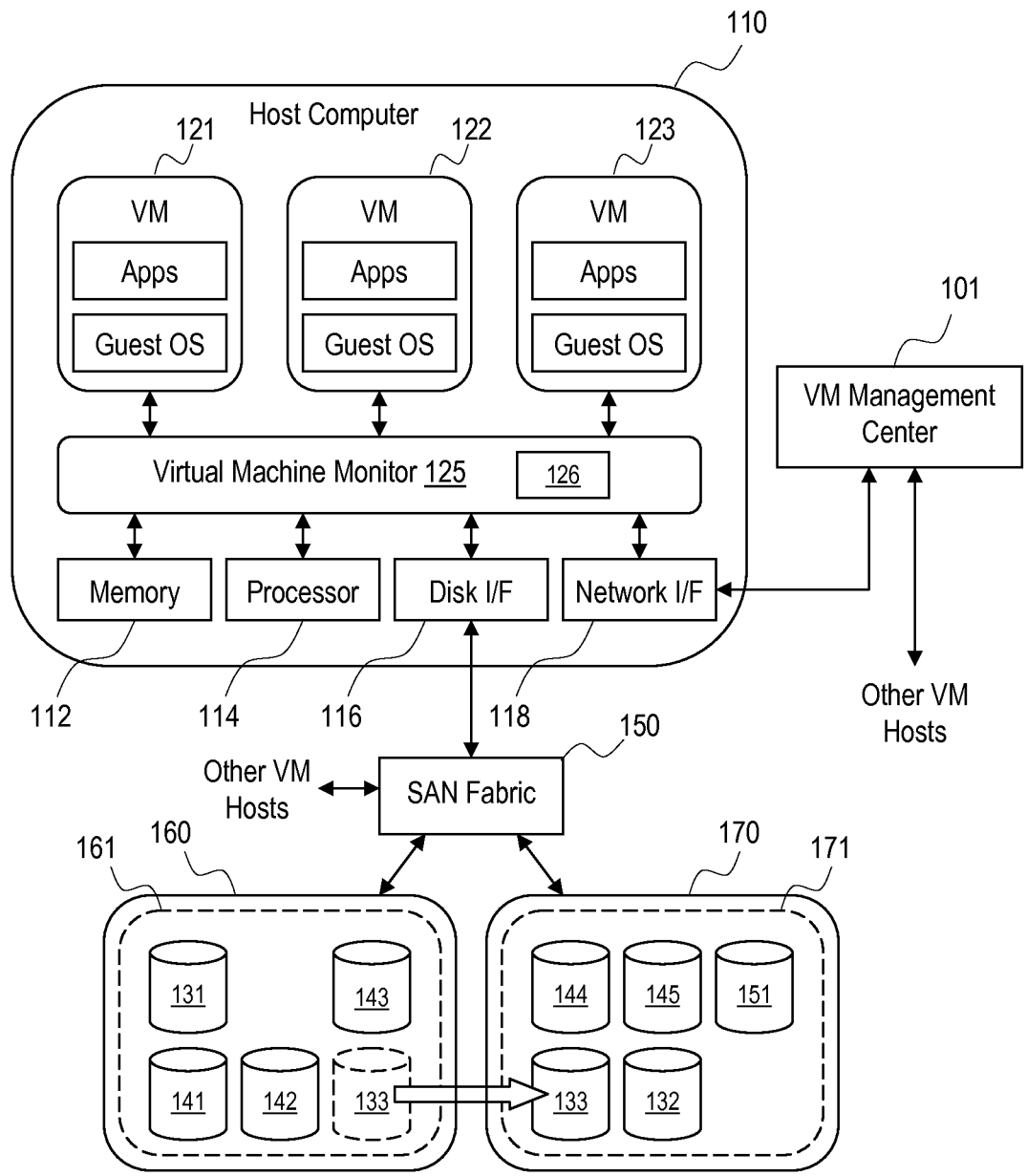
FIG. 1 depicts a block diagram of a virtualized computer system in which one or more embodiments of the present invention may be practiced.

FIG. 1 depicts a block diagram of a virtualized computer system in which one or more embodiments of the present invention may be practiced. The virtualized computer system includes a host computer 110 that has conventional components of a computing device, and may be implemented as a cluster of computing devices. Host computer 110 has configured therein one or more virtual machines, represented in FIG. 1 as VM 121, VM 122, and VM 123, that share hardware resources of host computer 110, such as system memory 112, processor 114, disk interface 116, and network interface 118. Examples of disk interface 116 are a host bus adapter and a network file system interface. An example of network interface 118 is a network adapter.

The virtual machines, VM 121, VM 122, and VM 123, run on top of a virtual machine monitor 125, which is a software interface layer that enables sharing of the hardware resources of host computer 110 by the virtual machines. Virtual machine monitor 125 may run on top of the host computer's operating system or directly on hardware components of the host computer. In some embodiments, virtual machine monitor 125 runs on top of a hypervisor that is installed on top of the hardware resources of host computer 110. Together, the virtual machines and virtual machine monitor 125 create virtualized computer systems that give the appearance of being distinct from host computer 110 and from each other. Each virtual machine includes a guest operating system and one or more guest applications. The guest operating system is a master control program of the virtual machine and, among other things, the guest operating system forms a software platform on top of which the guest applications run.

Data storage for host computer 110 is served by a storage area network (SAN), which includes a storage array 160 (e.g., a disk array), a storage array 170 (e.g., a disk array), and a switch (SAN fabric) 150 that connects host computer 110 to storage array 160 and storage array 170. Switch 150, illustrated in the embodiment of FIG. 1, is a SAN fabric switch, but other types of switches may be used. As illustrated, switch 150 is further connected to virtual machine host computers, other than host computer 110, whose files are also stored in storage array 160, and storage array 170. Typically, storage array 160 and storage array 170 are exposed to the host computers as logical unit numbers (LUNs), and there is a mapping between each LUN and physical devices, such as disk drives, in the storage arrays. In certain embodiments disclosed herein, it is assumed that there is a one-to-one correspondence between the LUNs and the storage arrays, such that storage array 160 is LUN 161 and storage array 170 is LUN 171. However, the invention is applicable to storage array configurations where the correspondence between the LUNs and the storage arrays is not one-to-one. Distributed storage systems other than SAN systems may also be used. For example, a network attached storage (NAS) system configured to expose a file system volume to clients may also be used.

In the embodiment illustrated in FIG. 1, LUN 161 includes disk images of four virtual machines and LUN 171 includes disk images of five virtual machines. VM 121 running in host computer 110 has a disk image 131 stored in LUN 161, and VM 122 running in host computer 110 has a disk image 132 stored in LUN 171. Disk image 133, which is the disk image corresponding to VM 123 running in host computer 110, is illustrated in dashed lines because it has been migrated to LUN 171. Disk images 141, 142, 143, 144, 145, 151 are disk images of virtual machines running in other virtual machine host computers. Disk images 141, 142, 143 are stored in LUN 161, and disk images 144, 145, 151 are stored in LUN 171.

A software component 126 is implemented inside virtual machine monitor 125 to monitor input-output operations (IOs) of the virtual machines. Alternatively, software component 126 may be implemented in the file system layer of the hypervisor. One example of software component 126 is the vscsiStats utility that is available from VMware Inc. Software component 126 generates histograms for the following parameters: (1) seek distance or randomness, which is a measure of the spatial locality in the workload measured as the minimum distance in terms of sectors or logical block numbers from among the last k number of IOs, a small distance signifying high locality; (2) IO data length, represented in different bins of size 512 Bytes, 1 KB, 2 KB, etc.; (3) outstanding IOs, denoting the queue length that virtual machine monitor 125 sees from a virtual machine; (4) IO rate; (5) IO latency, which is measured for each IO from the time it gets issued by the virtual machine until the virtual machine is interrupted for its completion; and (6) read/write ratio, which is a measure of number of read requests in relation to write requests. The histograms may be collected on a per virtual machine basis, a per virtual-disk basis (e.g., in cases where a single VM has multiple virtual disks), or any other technically feasible basis.

Figure 2:
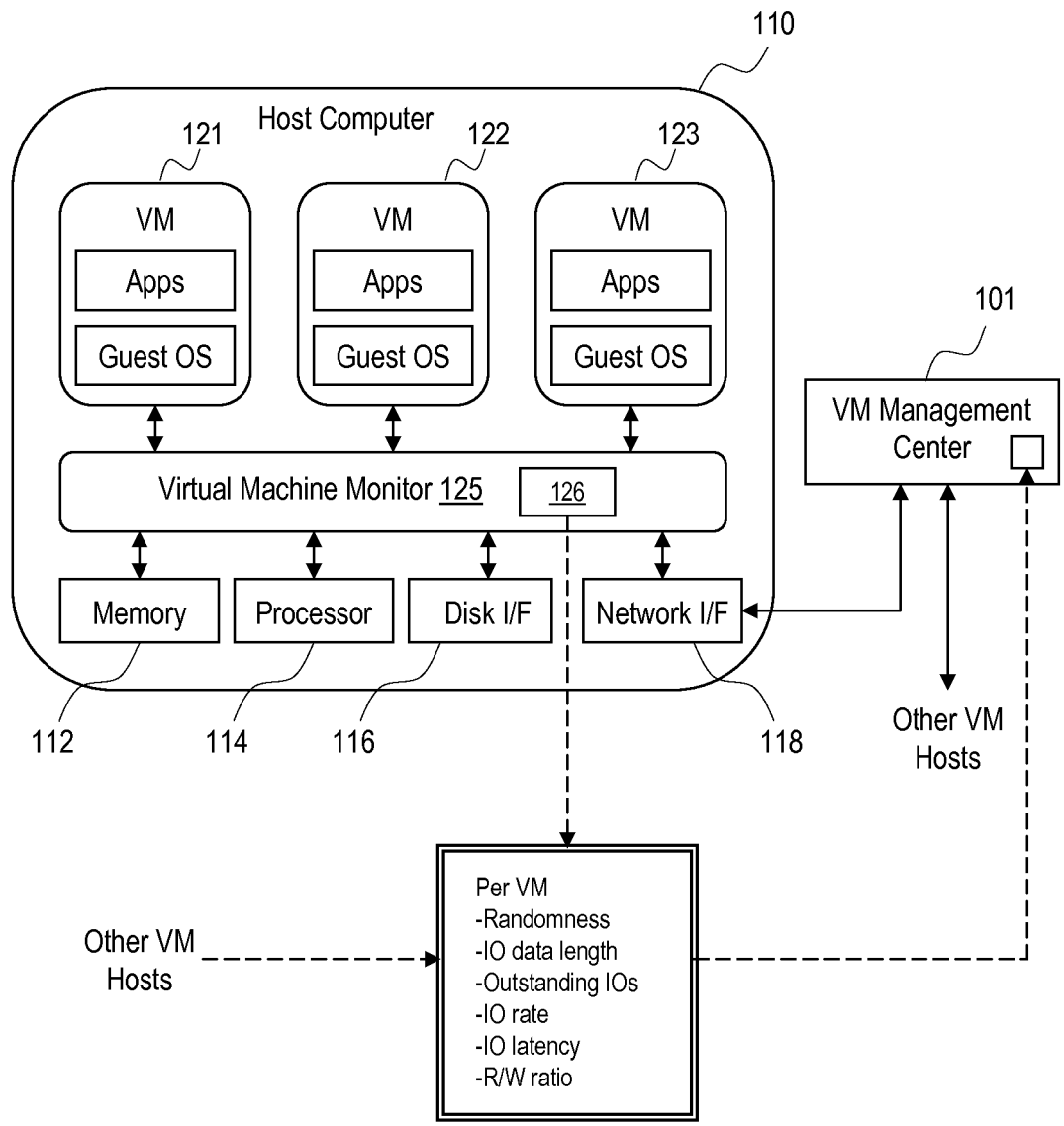
FIG. 2 shows the data collected by a component of the virtual machine monitor implemented in the virtualized computer system of FIG. 1.
Figure 3:
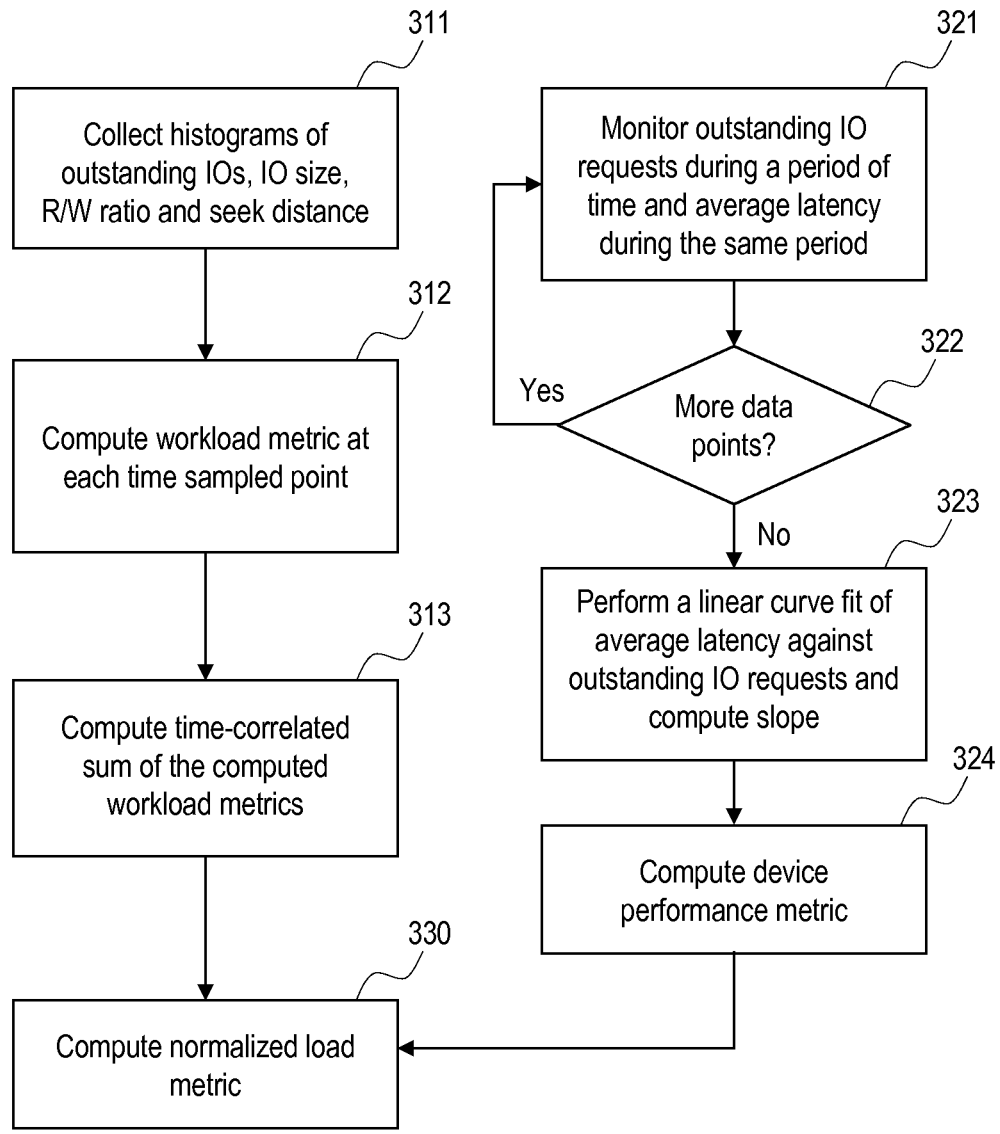
FIG. 3 is a flow diagram of a method for computing a normalized load metric, according to one or more embodiments of the present invention.
Figure 4:
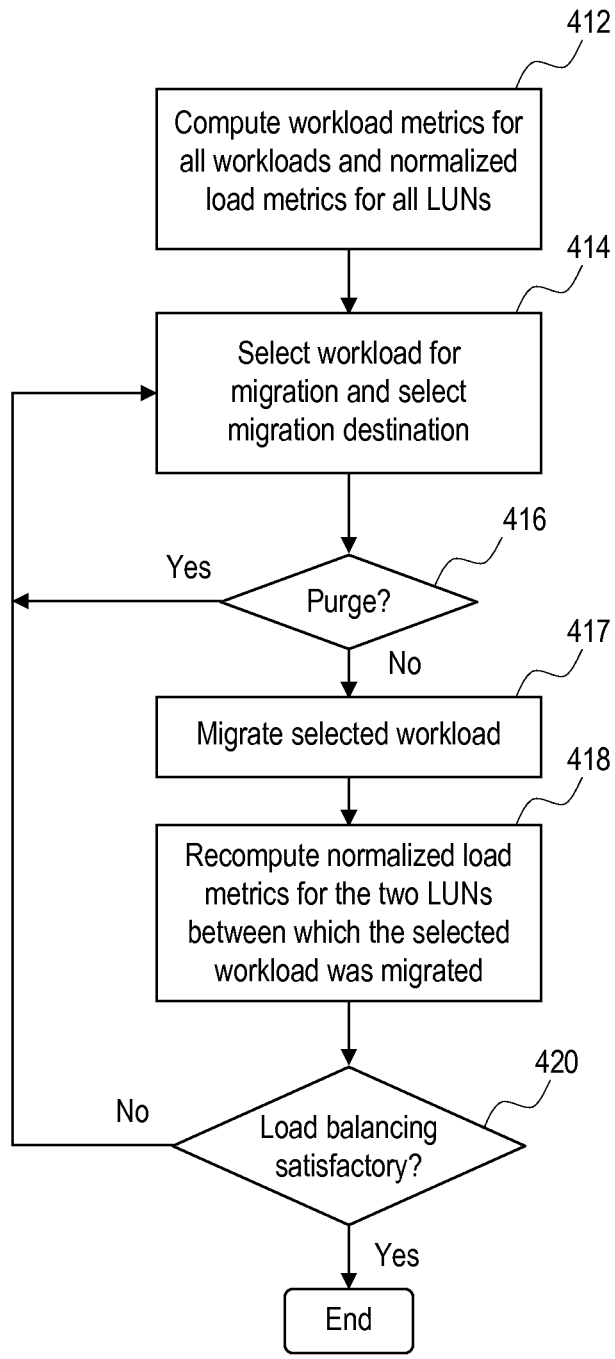
FIG. 4 is a flow diagram of a method for load balancing, according to one or more embodiments of the present invention.
Figure 6:
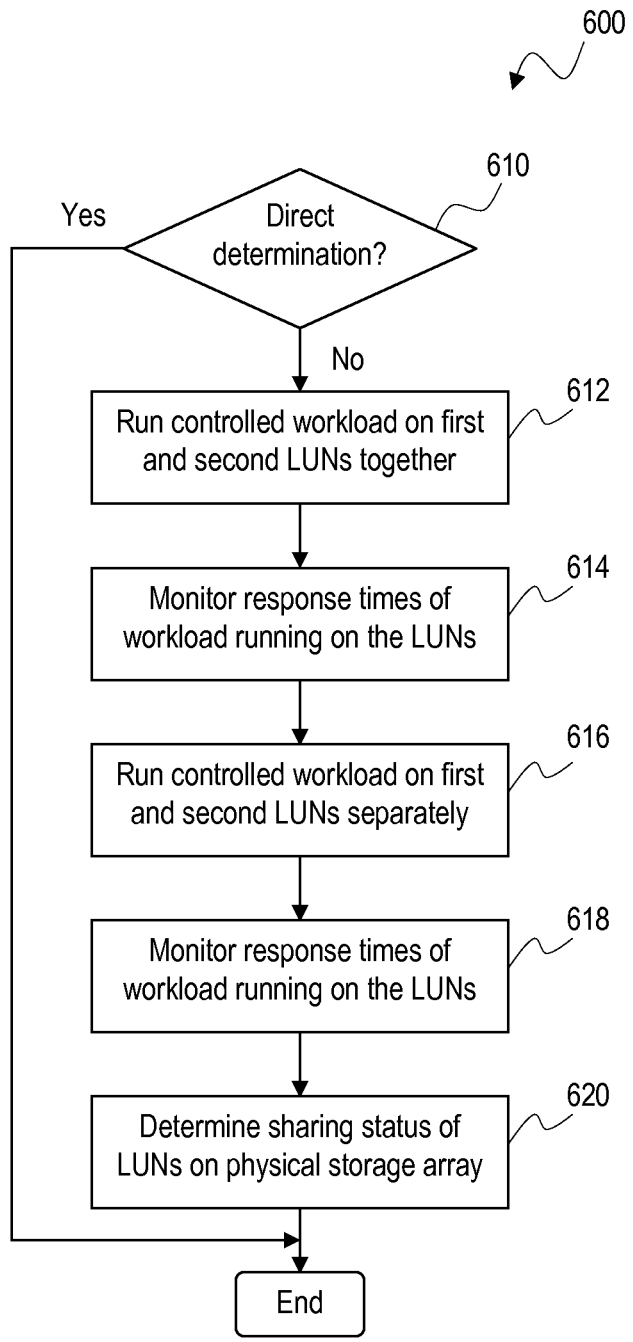
FIG. 6 is a flow diagram of a method for determining whether or not two storage units share the same physical storage array, according to an embodiment of the present invention.
Figure 7:
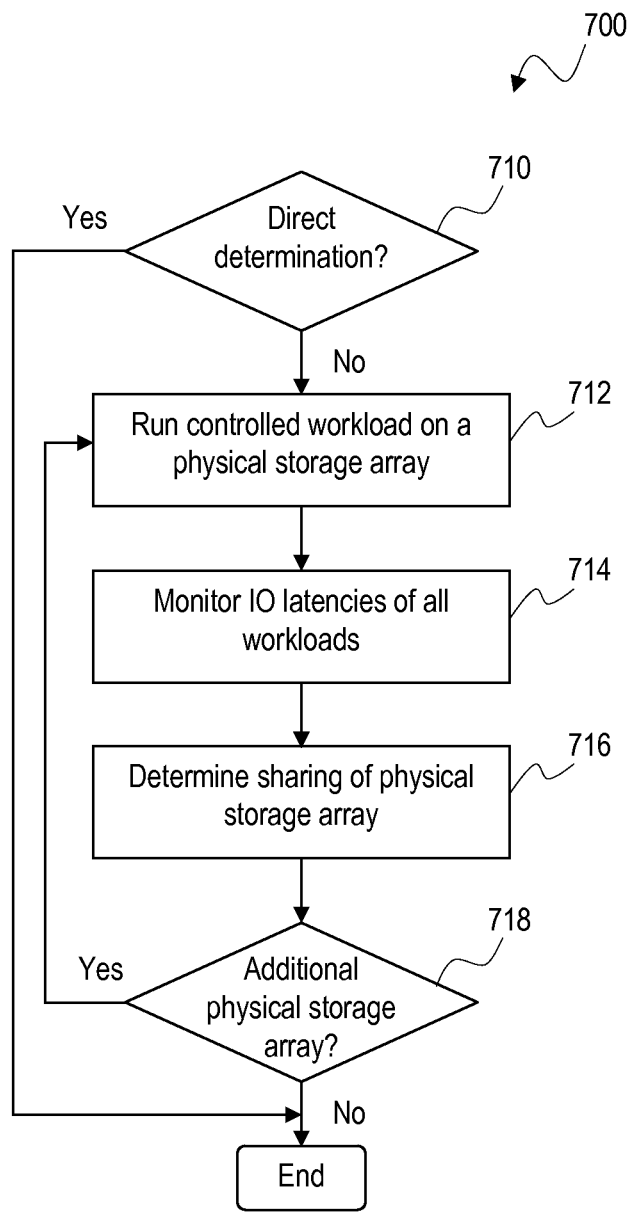
FIG. 7 is a flow diagram of a method for determining whether or not two storage units share the same physical storage array using distributed latency observation, according to another embodiment of the present invention.

FIG. 2 shows the data collected by software component 126. The collected data is used by processes running in a virtual machine management center 101 to carry out the methods illustrated in FIGS. 3-4 and 6-7. FIG. 3 is a flow diagram of a method for computing a normalized load metric, according to one or more embodiments of the present invention. FIG. 4 is a flow diagram of a method for load balancing, according to one or more embodiments of the present invention. FIGS. 6 and 7 are flow diagrams of a method for determining whether or not two storage units share the same physical storage array, according to embodiments of the present invention.

The processes running in virtual machine management center 101 that carry out the methods illustrated in FIGS. 3-4 and 6-7 rely on an analysis model that provides a workload metric, w, in relation to a performance metric, P, of the LUN that has been assigned to handle the workload. This measure is referred to herein as the "load metric" and is modeled as w/P. This load metric varies over time, as IO requests associated with the workload being modeled and the loads on the LUN assigned to the workload being modeled change over time. In alternative embodiments, the performance metric, P, may be monitored at a RAID (Redundant Array of Independent Disks) group level. This can be done either by aggregating the statistics for all LUNs created per RAID group or by using some special interface provided by the storage array vendor.

The workload is modeled using the following equation for IO latency, L, where OIO is the number of outstanding IOs, IOsize is the average size of IOs, read % is the percentage of read requests in the IOs, and random % represents the spatial locality of the workload.

$$L = \frac{(K_1 + OIO)(K_2 + IOsize)\left(K_3 + \frac{read\ \%}{100}\right)\left(K_4 + \frac{random\ \%}{100}\right)}{K_5} \qquad \text{[Eqn. 1]}$$

The numerator of Eqn. 1 represents the workload metric, w. The denominator $K_5$ represents a normalization factor, which characterizes overall performance that is specific to a related storage device. Higher performance storage devices are characterized by larger values of $K_5$. In one embodiment, K5 corresponds to performance metric P. Variations of this equation, which should be evident to those skilled in the art, may be used in other embodiments of the invention. In Eqn. 1, a high random % value correlates to the workload being highly random. A low random % value correlates to the workload being highly sequential. In one embodiment, the random % is derived as 100×(sum of all IOs that are greater than 2-3 MB away in the logical space)/(all IOs). It is also possible to assign randomness weight values in such a manner that IOs that are farther away receive higher weight values. One way to compute the random % without histograms is to keep a run-length parameter, where runlength is incremented if the next 10 is very close to the previous one; otherwise it is reset. In such a case, the random %=100/runlength.

As a first step, IOs to the workload are varied over a period in such a manner that OIO, IOsize, read %, and random % of varying sizes are collected by software component 126. For each set of <OIO, IOsize, read %, random %>, the IO latency is also collected by software component 126. The constants, $K_1, K_2, K_3$, and $K_4$, are computed on the basis of the collected data in the following manner.

To compute $K_1$, two IO latency values, $L_1$ and $L_2$, with different OIO values and the same value for the other three parameters are used.

$$K_1 = \frac{OIO_1 - OIO_2 * L_1/L_2}{L_1/L_2 - 1} \quad [\text{Eqn. 2}]$$

This is repeated for all pairs of IO latency values where the OIO values differ while the other three variables remain the same. A number of $K_1$ values are obtained in this manner and the median of the different $K_1$ values is selected. Selecting a median ensures that the $K_1$ value is not biased by few extreme values. This procedure is repeated to compute each of $K_2, K_3$, and $K_4$. In one embodiment, K1 to K4 are computed empirically and then used as fixed values in the algorithm. Once these values are computed and fixed in the algorithm, online monitoring is performed to obtain workload specific parameters, such as OIO, IO size, read % and random %.

The performance metric of LUNs is dependent on device level characteristics, such as number of physical disks backing the LUN, rotational speed of the disk drives, average seek delay, etc., which are device-level information generally unknown to the host computers. Storage arrays are exposed to the host computers as a LUN and generally do not expose an application programming interface that allows the host computer to query the LUN regarding device level information. This complicates any load balancing decisions because an administrator who is contemplating a virtual disk migration from one storage array to another needs to know if the move is to a LUN that is backed with 20 disks or to a LUN that is backed with 5 disks.

For modeling the performance of LUNs, the IO latency is used as the main performance metric. For each LUN, data pairs consisting of number of outstanding IOs (OIOs) and average IO latency observed are collected for a number of time intervals. This information can be gathered with little overhead because the host computer knows the average number of outstanding IOs that are sent to a LUN and it already measures the average IO latency experienced by the IOs. As previously described, this information is collected by software component 126.

It is well understood that IO latency increases more or less linearly with the increase in number of outstanding IOs. Given this knowledge, the set of data points <OIO, IO latency> is collected online over a period of time and a linear fit line which minimizes the least squares error for the data points is computed. The parameter P is taken as the inverse of the slope of the linear fit line, such that higher P's generally correlate to higher performance. The parameter P is computed in this manner for each LUN. Alternatively, the technique for modeling the performance of LUNs that is described in U.S. patent application Ser. No. 12/869,878, filed on Aug. 27, 2010, which is incorporated by reference herein, may be used in computing the parameter P in the embodiments of the present invention.

In cases where device level information is available, the modeling can be performed on a per storage array basis, so that the parameter P is computed above for each storage array. Other ways of modeling the parameter P are possible. For example, in one embodiment, read OIOs and read latencies are used instead of overall OIOs and overall latency. In another embodiment, data points associated with large 10 sizes (e.g., greater than 64 KB) and/or high sequentiality (i.e., low randomness, e.g., random % less than 10%) are ignored. The goal with each variation discussed above is to make the device model as independent of the workload as possible.

For load balancing, workloads of virtual machines are grouped based on the location of their disk images (i.e., LUN in which the disk images are stored) and a normalized load metric is computed for each LUN (i.e., the sum of workload metrics, W, for all workloads associated with the LUN divided by the parameter P for the LUN). For example, in the embodiment illustrated in FIG. 1, the normalized load metric for LUN 161 is the sum of workload metrics for workloads associated with disk images 131, 141, 142, 143 divided by the parameter P for LUN 161, and the normalized load metric for LUN 171 is the sum of workload metrics for workloads associated with disk images 132, 133, 144, 145, 151 divided by the parameter P for LUN 171. Heuristics are then employed to find migration candidates and migration destinations that will balance the workloads across the LUNs. Any technically feasible technique can be used to perform this balancing. In one embodiment, the LUNs with the highest and lowest normalized load metrics are identified. Then, a virtual machine disk image in the LUN with the highest normalized load metric is migrated to the LUN with the lowest normalized load metric. This process is repeated until there is good balance across the LUNs.

In alternative embodiments, searching for the migration candidates can be biased in several ways. In one embodiment, disk images of virtual machines that have the smallest size/L are selected first, so the amount of data migrated can be minimized while maintaining the same effect on load balancing. In another embodiment, disk images of virtual machines that have the smallest current IO rate are selected first, so that the impact of migration now is minimal.

Recommendations for migrating disk images of virtual machines can be presented to the user as suggestions or can be carried out automatically during periods of low activity. In addition, recommendations on initial placement of disk images of virtual machines in LUNs can be made. For example, LUNs with relatively small normalized load metrics may be selected as candidates for initial placement of disk images of new virtual machines.

In a further refinement, workloads are divided into three groups: sequential, local (somewhat sequential) and random. Experiments have confirmed that random workloads interfere destructively with sequential workloads. Since the objective of the model described above is for virtual machine disk image placement, performance loss from this effect can be minimized by careful workload segregation. Thus, as part of the load balancing step, affinity and anti-affinity hints can be incorporated by running multiple rounds of the model, one each for the segregated set of storage units. For example, the model is run for all the storage units hosting sequential workloads and load balancing is performed amongst these storage units. The model is then run again for the second group of storage units hosting somewhat sequential workloads and load balancing is performed amongst these storage units. The model is then run again for the third group of storage units hosting random workloads and load balancing is performed amongst these storage units. In addition, sequential workloads are identified and placed on isolated devices as much as possible. In an alternative embodiment, workloads can be divided into two groups, sequential and random, so that the user can create separate LUNs for the sequential workloads or find better placement for the sequential workloads.

FIG. 3 is a flow diagram of a method for computing a normalized load metric for a LUN, according to one or more embodiments of the present invention. For each workload running on the LUN, the relevant workload parameters are monitored by collecting histograms of time samples of outstanding IOs, IO size, read/write ratio, and seek distance (Step 311). Each time sample may represent a maximum, an N-th percentile (e.g., 90th percentile), mean, median, or mode of the values collected over a finite time window, e.g., 20 seconds. In step 312, the workload metric, w, is computed at each point in time where the outstanding IOs, IO size, read/write ratio, and seek distance have been time sampled. For example, if the time samples of the four variables are represented as a time series of $\{S_i(0), S_i(1), S_i(2), \ldots, S_i(z)\}$, where i may be 1, 2, 3 or 4 and z represents discrete points in time, the workload metric, w(z), is computed at each of the discrete points in time using the values of the four variables ($S_1, S_2, S_3, S_4$) at each such discrete point in time. In other words, w(0) is a function of $S_1(0), S_2(0), S_3(0), S_4(0)$ and w(1) is a function of $S_1(1), S_2(1), S_3(1), S_4(1)$, and so forth. Step 312 is carried out for each of the workloads being monitored. In Step 313, a time-correlated sum of workload metrics for all workloads associated with the LUN is computed. For example, if the workload metrics are represented as a time series of $\{w_i(0), w_i(1), w_i(2), \ldots, w_i(z)\}$, where i may be 1, 2, ..., N (N representing the number of workloads) and z represents discrete points in time, the time-correlated sum of the workload metrics is computed at each of the discrete points in time as the summation of all w's at each such discrete point in time. This time-correlated sum is computed at each of the discrete points in time over an assessment period, as further described below in conjunction with FIG. 5A, and is used to compute the normalized load metric in step 330.

For the LUN for which a normalized load metric is being computed, the number of outstanding IO requests and the average IO latency are monitored over a time interval (Step 321). Step 321 is repeated as needed for different time intervals. When a sufficient number of data points for a linear fit have been collected (Step 322), the linear fit is carried out and the slope of the linear fit line is computed (Step 323). In Step 324, the performance metric, P, for the LUN is computed as 1/(slope of the linear fit line).

In step 330, the normalized load metric for the LUN is computed as the time-correlated sum of the workload metrics for all workloads associated with the LUN, as obtained from Step 313, divided by the performance metric for the LUN, as obtained from Step 324. This normalized load metric is computed at each point in the time-correlated sum is computed in Step 313. In one embodiment, the 90th percentile value of this time series of normalized load metrics is used as the representative load metric for the LUN. In another embodiment, a weighted sum of two or more different percentile values of this time series of normalized load metrics is used as the representative load metric for the LUN. For example, the weighted sum may give a weight of 0.5 to the 90th percentile value, a weight of 0.3 to the 70th percentile value, and a weight of 0.2 to the 50th percentile value.

The method of FIG. 3 is repeated for all LUNs so that a workload metric for all workloads and a representative normalized load metric for all LUNs are obtained.

FIG. 4 is a flow diagram of a method for load balancing, according to one or more embodiments of the present invention. In Step 412, the workload metrics for all workloads and the normalized load metrics for all LUNs are calculated as described above. In Step 414, a workload is selected for migration from its current LUN (source LUN) to a destination LUN. This selection can be done by examining the workload metrics for all workloads and the representative normalized load metrics for all LUNs using any heuristic known in the art for load balancing, and excludes any migration recommendations that have been previously purged in step 416. In Step 416, it is determined whether a migration recommendation from step 414 should be purged or not. In one embodiment, a migration recommendation is purged if the recommended migration is between LUNs that are determined to share the same physical storage array. The method of determining whether or not LUNs share the same physical storage array is described below in conjunction with FIGS. 6 and 7. In another embodiment, a migration recommendation is purged if the current average latency associated with the destination LUN is higher than the current average latency associated with the source LUN. In other embodiments, a migration recommendation may be purged if the destination LUN exhibits large spikes in its normalized load metric not reflected in its representative normalized load metric. For example, if the 90th percentile value of normalized load metrics is used as the representative load metric and the destination LUN has a very high 95th percentile value but a low 90th percentile value, the move to this LUN may be recommended by the heuristics employed in step 414 but purged in step 416 as a result of the high 95th percentile value.

The selected workload is migrated from the source LUN to the destination LUN in Step 417. If the workload is a virtual machine workload, the migration may be carried out using the Storage VMotion™ product that is available from VMware Inc. of Palo Alto, Calif. In Step 418, the normalized load metrics for the two LUNs between which the selected workload was migrated are recomputed. If the load balancing is satisfactory (Step 420), the process ends. If not, Steps 414-420 are repeated.

When generating workload migration recommendations, priority may be given to recommendations that are consistent over a range of percentile values for normalized load metrics. For example a workload migration recommendation that is consistent when considering 90th percentile, 70th percentile, and 50th percentile values for normalized load metrics is given priority over a migration recommendation that only applies to a 90th percentile value for normalized load metrics.

The method associated with the flow diagrams of FIGS. 3 and 4 may be carried out over an entire assessment period, which is in one example, 24 hours. Alternatively, the assessment period may be divided up into two or more periods of varying congestion levels of the storage system. In one embodiment, the assessment period is divided into a congested period and a non-congested period and load balancing is performed only during the congested period. Workload metrics and normalized load metrics may still be computed during the uncongested period because as mentioned above there may be instances where migration to a destination LUN may not be desired if the destination LUN exhibits large spikes in its normalized load metric not reflected in its representative normalized load metric. In one example, the state of the storage system is deemed to be congested at a particular point in time when one of the LUNs of the storage system at that point in time has an average latency that is greater than a threshold latency, which may be defined as latency corresponding to a certain percentage of the maximum throughput of the LUN.

Figure 5A:
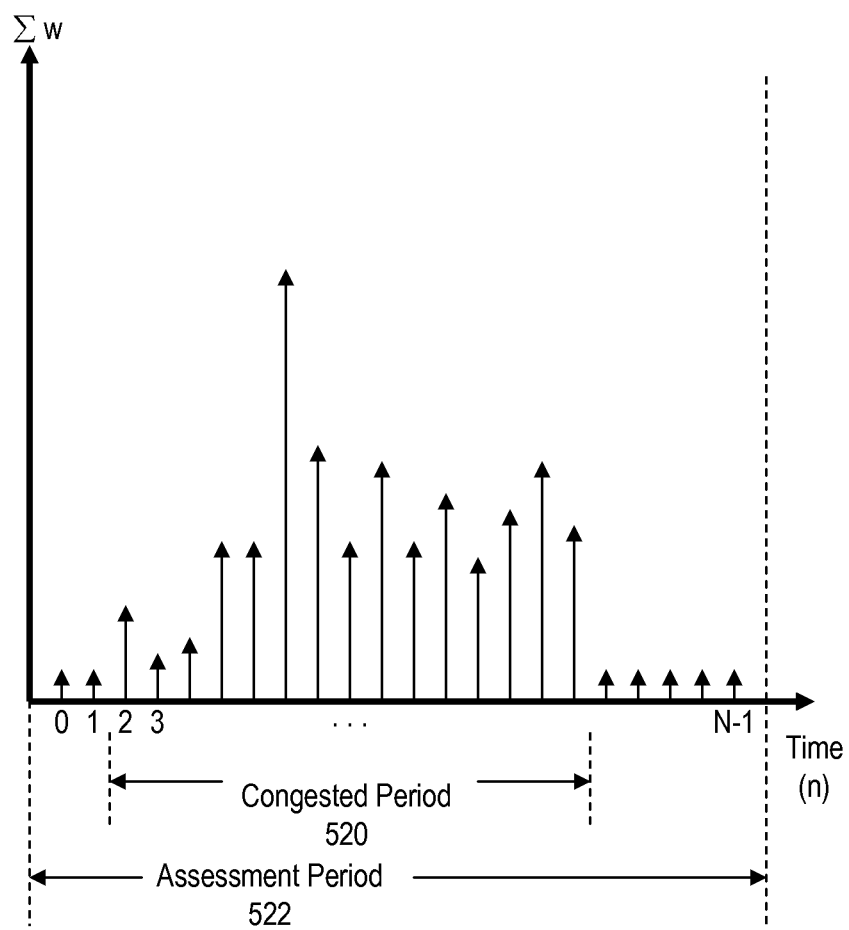
FIG. 5A is a graph representation of a time-correlated sums of workload metrics computed over an assessment period for a particular storage unit.

FIG. 5A is a graph representation of the time-correlated sums of the workload metrics, w, for workloads running in a particular LUN, as computed at discrete points in time. At each point in time, the workload metrics computed at that point in time for the different workloads running in the LUN are summed. The y-axis of the graph shown in FIG. 5A represents the summed value. The time period of interest may be defined as a congested period 520 or the entire assessment period 522 and the representative normalized load metric of the LUN is determined as the 90th percentile value in this time period of interest or as a weighted sum of two or more different percentile values in this period of interest.

Figure 5B:
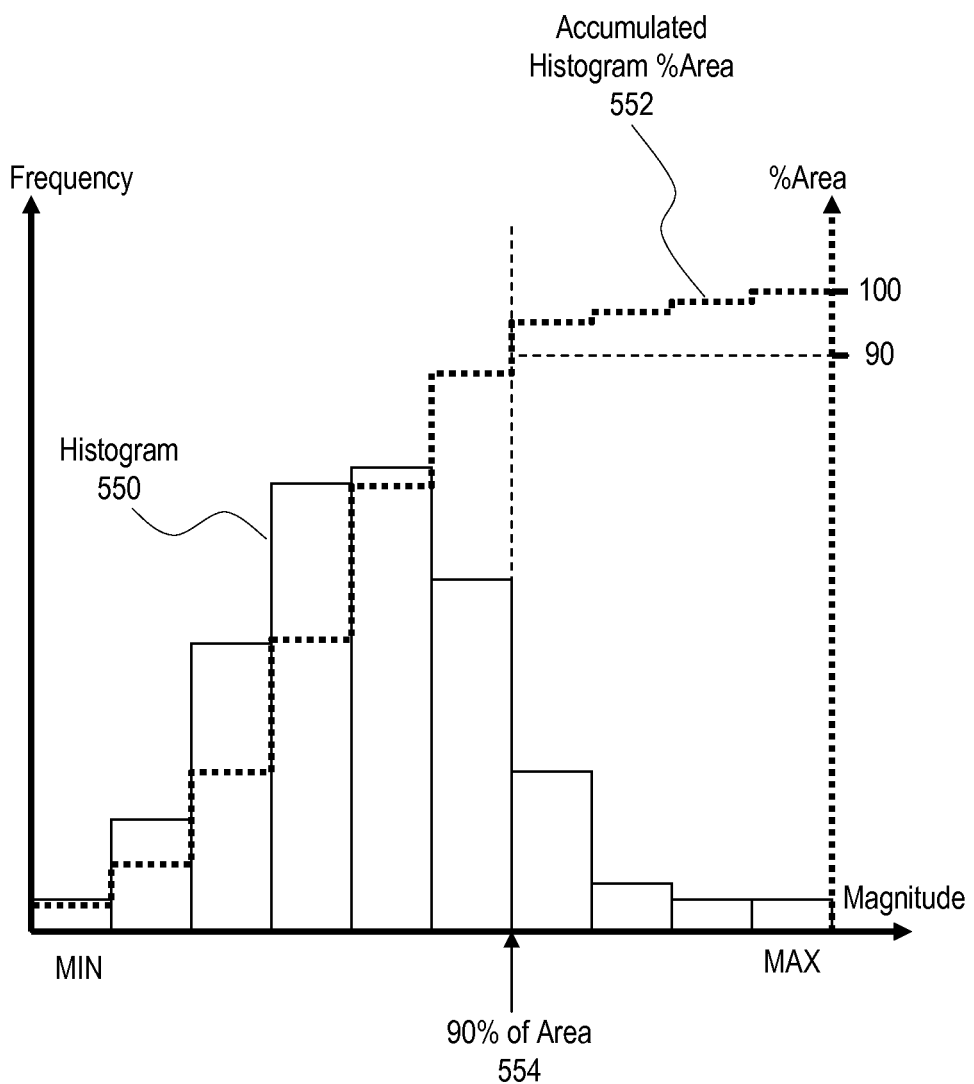
FIG. 5B illustrates a histogram of samples and an associated graph of accumulated histogram area.

The set of N samples shown in FIG. 5A may be stored directly in an array comprising N elements, where each element stores one sample S(n). Alternatively, in certain applications the set of N samples may be stored in a more compact form as a histogram having less than N buckets. FIG. 5B illustrates a histogram 550 of samples and an associated graph of accumulated histogram area 552. One or more percentile values, such as the 90th percentile value 554, may be obtained using histogram 550 and the associated graph of accumulated histogram area 552 to characterize a given set of time samples, such as described above for normalized load metrics for a LUN. In the embodiments of the present invention where the assessment period is divided up into two or more periods of varying congestion levels of the storage system, a histogram of normalized workload metrics is maintained for each LUN and for each congestion level, and the associated graph of accumulated histogram area may be used to determine the N-th percentile value of the normalized workload metrics.

FIG. 6 is a flow diagram of method steps 600 for determining whether or not two LUNs share the same physical storage array, according to an embodiment of the present invention. In step 610, a direct determination of whether the two LUNs are on the same physical storage array is performed if possible, based on available data. Direct determination may be based on one or more storage configuration files, if available, that indicate a correspondence between the LUNs and the underlying physical storage array. Direct determination may also be based on a query to a storage array application programming interface (API), if the API is available and configured to supply information required to indicate whether the two LUNs are associated or not associated with the same underlying physical storage array. Direct determination that the two LUNs are on different storage arrays may be based on information for the two LUNs, such as a LUN vendor string, device model number, or any other LUN configuration information. For example, if each of the two LUNs each report a different vendor name, then the two LUNs are determined to be stored on different storage arrays. If it can be directly determined that the two LUNs share or do not share the same physical storage array, then method 600 ends. If such determination cannot be made directly, then method 600 proceeds to steps 612-620 by which a controlled workload is injected into the two LUNs to determine whether the two LUNs share a physical storage array.

In step 612, the controlled workload is run on the two LUNs together and in step 614 the response times are monitored for requests associated with the workload. In step 616, the controlled workload is run on the two LUNs separately, and in step 618 the response times are monitored for requests associated with the workload. In step 620, the sharing status of the two LUNs is determined with respect to a physical storage array based on response times. If the response times of the two LUNs are highly correlated when subjected to the workload, then the two LUNs likely share a physical storage array. Importantly, if the two LUNs are sufficiently correlated, then they likely share a common set of physical storage devices, such as drive spindles. Correlation may be determined using any technically feasible technique. For example, if response times for the two LUNs exhibit concurrent and similar increases and decreases under a common workload, then correlation may be established. If the correlation is consistent in both time and changes in delay, then the correlation can be sufficient to conclude the two LUNs share a common physical storage media. The method terminates after step 620.

FIG. 7 is a flow diagram of method steps 700 for determining whether or not two LUNs share the same physical storage array using distributed latency observation, according to another embodiment of the present invention. In step 710, a direct determination of whether the two LUNs are on the same physical storage array is performed if possible, based on available data. Direct determination may be based on one or more storage configuration files, if available, that indicate a correspondence between the LUNs and the underlying physical storage array. Direct determination may also be based on a query to a storage array application programming interface (API), if the API is available and configured to supply information required to indicate whether the two LUNs are definitely associated or not associated with the same underlying physical storage array. Direct determination that the two LUNs are on different storage arrays may be based on information for the two LUNs, such as a LUN vendor string, device model number, or any other LUN configuration information. For example, if each of the two LUNs each report a different vendor name, then the two LUNs are conclusively stored on different storage arrays. If it can be directly determined that the two LUNs share or do not share the same physical storage array, then method 700 ends. If such determination cannot be made directly, then method 700 proceeds to steps 712-716 by which a controlled workload is injected into the physical storage array, with resulting impact monitored by a plurality of other hosts to determine which LUNs are associated with the physical storage array. Each known physical storage array may be tested in this way to determine a more complete mapping set. Determining whether the two LUNs share a physical storage array may be accomplished based on the mapping set.

In step 712, the physical storage array is opened in raw mode and the controlled workload is run on a physical storage array. The controlled workload may be a random read across to the physical storage array or a file creation followed by writes to the created file. Then, in step 714, the IO latencies are observed for all of the workloads within host computer 110. In one embodiment, IO latencies are also observed for other host computers coupled to related storage arrays, such as storage arrays 160 and 170. The workloads whose IO latencies correlate with the controlled workload are determined to be running on the same physical storage array. Therefore, the LUNs associated with those workloads are determined to share the same physical storage array (step 716). Step 718 is a check to see if the controlled workload has been run on all physical storage arrays. If there are more, method 700 returns to step 712 and steps 712-716 are carried out on a different storage array. If there are no more, method 700 ends.

In methods 600 and 700 described above, when two LUNs are determined to be mapped to the same underlying storage array, and a third LUN is determined to be mapped to the same underlying storage array as one of the two LUNs, then, it can be concluded based on the transitivity property that all three LUNs are determined to be sharing the same underlying storage array.

In the embodiments of the present invention described above, read and write IOs are considered together in the model. In alternative embodiments, read workloads and write workloads are modeled separately and migration decisions are made in accordance with one of the two models.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of managing distributed storage resources including at least a first storage unit and a second storage unit, comprising:
   while the first storage unit and the second storage unit are online, monitoring workloads associated with objects stored in the first storage unit and the second storage unit at multiple points in time over a time interval, and monitoring performance of the first storage unit and the second storage unit, each of the monitored workloads being a function of time-correlated samples of measured data including the number of outstanding input output requests to an associated object and an average size of input output requests to the associated object;
   computing normalized load metrics for the first storage unit based on time-correlated sums of the workloads monitored on the first storage unit over the time interval, each of the workloads monitored on the first storage unit over the time interval being associated with a respective one of the objects stored in the first storage unit, and the monitored performance of the first storage unit, wherein each of the time-correlated sums of the workloads monitored on the first storage unit is computed at a respective point in time as a summation of the workloads monitored on the first storage unit at the respective point in time;

computing normalized load metrics for the second storage unit based on time-correlated sums of the workloads monitored on the second storage unit over the time interval, each of the workloads monitored on the second storage unit over the time interval being associated with a respective one of the objects stored in the second storage unit, and the monitored performance of the second storage unit, wherein each of the time-correlated sums of the workloads monitored on the second storage unit is computed at a respective point in time as a summation of the workloads monitored on the second storage unit at the respective point in time; and identifying one or more of the objects as candidates for migration between the first storage unit and the second storage unit based on the computed normalized load metrics of the first storage unit and the second storage unit.

2. The method of claim 1, wherein the performance of the first storage unit is dependent on a relationship between the number of outstanding input-output requests to the first storage unit and an average latency of input-output requests to the first storage unit at multiple points in time, and the performance of the second storage unit is dependent on a relationship between the number of outstanding input-output requests to the second storage unit and an average latency of input-output requests to the second storage unit at multiple points in time.

3. The method of claim 2, further comprising:
determining that the distributed storage resources are in a congested state at a point in time when one of the storage units at said point in time has an average latency that is greater than a threshold latency,
wherein the time interval covers the points in time during which the distributed storage resources are in the congested state.

4. The method of claim 1, further comprising:
conditionally rejecting an identified object as a candidate for migration between the first storage unit and the second storage unit.

5. The method of claim 4, wherein the rejecting occurs if the first storage unit and the second storage unit are determined to share a physical storage array.

6. The method of claim 4, wherein the first storage unit is a source storage unit and the second storage unit is a destination storage unit, and the rejecting occurs if an average latency associated with the second storage unit is higher than an average latency associated with the first storage unit.

7. The method of claim 4, wherein the rejecting occurs if the first storage unit and second storage unit are determined to share physical hardware resources.

8. The method of claim 4, wherein the first storage unit is a source storage unit and the second storage unit is a destination storage unit, and further comprising:
computing normalized load metrics for the second storage unit based on time-correlated sums of workloads monitored on the second storage unit over another time interval during which the distributed storage resources are determined to be in a less congested state,
wherein the rejecting occurs if a predetermined number of the normalized load metrics computed for the second storage unit over said another time interval exceeds a threshold value.

9. The method of claim 1, wherein the identifying is performed based on a representative normalized load metric of the first storage unit and a representative normalized load metric of the second storage unit.

10. The method of claim 9, wherein the representative normalized load metric is equal to an N-th percentile value of the computed normalized load metrics.

11. The method of claim 9, wherein the representative normalized load metric is equal to a weighted sum of two or more different percentile values of the computed normalized load metrics.

12. The method of claim 1, wherein the workloads are monitored for read requests.

13. The method of claim 1, wherein the workloads are monitored for write requests.

14. The method of claim 1, wherein the measured data further includes a percentage of reads in the input-output requests to the associated object.

15. The method of claim 1, wherein the measured data further include a value representative of the randomness of the input-output requests to the associated object.

16. The method of claim 1, wherein the objects comprise disk images of virtual machines.

17. The method of claim 1, wherein the objects comprise portions of disk images of virtual machines.

18. A method of migrating workloads between a first storage unit and a second storage unit of a shared storage system that includes physically separate storage arrays, comprising:
while the first storage unit and the second storage unit are online, monitoring workloads associated with objects stored in the first storage unit and the second storage unit at multiple points in time over a time interval, each of the monitored workloads being a function of time-correlated samples of measured data including the number of outstanding input output requests to an associated object and an average size of input output requests to the associated object;
computing normalized load metrics for the first storage unit based on time-correlated sums of the workloads monitored on the first storage unit over the time interval, each of the workloads monitored on the first storage unit over the time interval being associated with a respective one of the objects stored in the first storage unit, and a monitored performance of the first storage unit, wherein each of the time-correlated sums of the workloads monitored on the first storage unit is computed at a respective point in time as a summation of the workloads monitored on the first storage unit at the respective point in time;
computing normalized load metrics for the second storage unit based on time-correlated sums of the workloads monitored on the second storage unit over the time interval, each of the workloads monitored on the second storage unit over the time interval being associated with a respective one of the objects stored in the second storage unit, and a monitored performance of the second storage unit, wherein each of the time-correlated sums of the workloads monitored on the second storage unit is computed at a respective point in time as a summation of the workloads monitored on the second storage unit at the respective point in time; and
migrating one of the workloads between the first storage unit and the second storage unit based on the computed normalized load metrics of the first storage unit and the second storage unit.

19. The method of claim 18, further comprising:
determining whether the first storage unit and the second storage unit share a physical storage array.

20. The method of claim 19, further comprising:
running a controlled workload on the first storage unit and the second storage unit together and then separately, and monitoring response times of the first storage unit and the second storage unit as the controlled workload is run on them together and then separately, wherein the determining of whether the first storage unit and the second storage unit share the physical storage array is based on the monitored response times.

21. The method of claim 19, further comprising:

running a controlled workload on a physical storage array; and monitoring latencies of input-output requests, wherein the determining of whether the first storage unit and the second storage unit share the physical storage array is based on the monitored latencies.

22. The method of claim 21, wherein the controlled workload includes a plurality of random reads across the physical storage array.

23. The method of claim 21, wherein the controlled workload includes file creation and writes to the created file.

24. A non-transitory computer-readable storage medium comprising instructions which, when executed in a computing device coupled to distributed storage resources including at least a first storage unit and a second storage unit, causes the computing device to carry out the steps of:

while the first storage unit and the second storage unit are online, monitoring workloads associated with objects stored in the first storage unit and the second storage unit at multiple points in time over a time interval, and monitoring performance of the first storage unit and the second storage unit, each of the monitored workloads being a function of time-correlated samples of measured data including the number of outstanding input output requests to an associated object and an average size of input output requests to the associated object;

computing normalized load metrics for the first storage unit based on time-correlated sums of the workloads monitored on the first storage unit over the time interval, each of the workloads monitored on the first storage unit over the time interval being associated with a respective one of the objects stored in the first storage unit, and the monitored performance of the first storage unit, wherein each of the time-correlated sums of the workloads monitored on the first storage unit is computed at a respective point in time as a summation of the workloads monitored on the first storage unit at the respective point in time;

computing normalized load metrics for the second storage unit based on time-correlated sums of the workloads monitored on the second storage unit over the time interval, each of the workloads monitored on the second storage unit over the time interval being associated with a respective one of the objects stored in the second storage unit, and the monitored performance of the second storage unit, wherein each of the time-correlated sums of the workloads monitored on the second storage unit is computed at a respective point in time as a summation of the workloads monitored on the second storage unit at the respective point in time; and identifying one or more of the objects as candidates for migration between the first storage unit and the second storage unit based on the computed normalized load metrics of the first storage unit and the second storage unit.

25. The non-transitory computer-readable storage medium of claim 24, further comprising instructions which, when executed in a computing device, causes the computing device to carry out the steps of:

determining that the distributed storage resources are in a congested state at a point in time when one of the storage units at said point in time has an average latency that is greater than a threshold latency, wherein the time interval covers the points in time during which the distributed storage resources are in the congested state.

26. A non-transitory computer-readable storage medium comprising instructions which, when executed in a computing device coupled to distributed storage resources including at least a first storage unit and a second storage unit, causes the computing device to carry out the steps of:

while the first storage unit and the second storage unit are online, monitoring workloads on the first storage unit and the second storage unit at multiple points in time over a time interval, each of the monitored workloads being a function of time-correlated samples of measured data including the number of outstanding input output requests to an associated object and an average size of input output requests to the associated object;

computing normalized load metrics for the first storage unit based on time-correlated sums of the workloads monitored on the first storage unit over the time interval;

computing normalized load metrics for the second storage unit based on time-correlated sums of the workloads monitored on the second storage unit over the time interval; and migrating one of the workloads between the first storage unit and the second storage unit based on the computed normalized load metrics of the first storage unit and the second storage unit.

27. The non-transitory computer-readable storage medium of claim 26, further comprising instructions which, when executed in a computing device, causes the computing device to carry out the steps of:

determining whether the first storage unit and the second storage unit share a physical storage array.

* * * * *